Figures 1, 2:
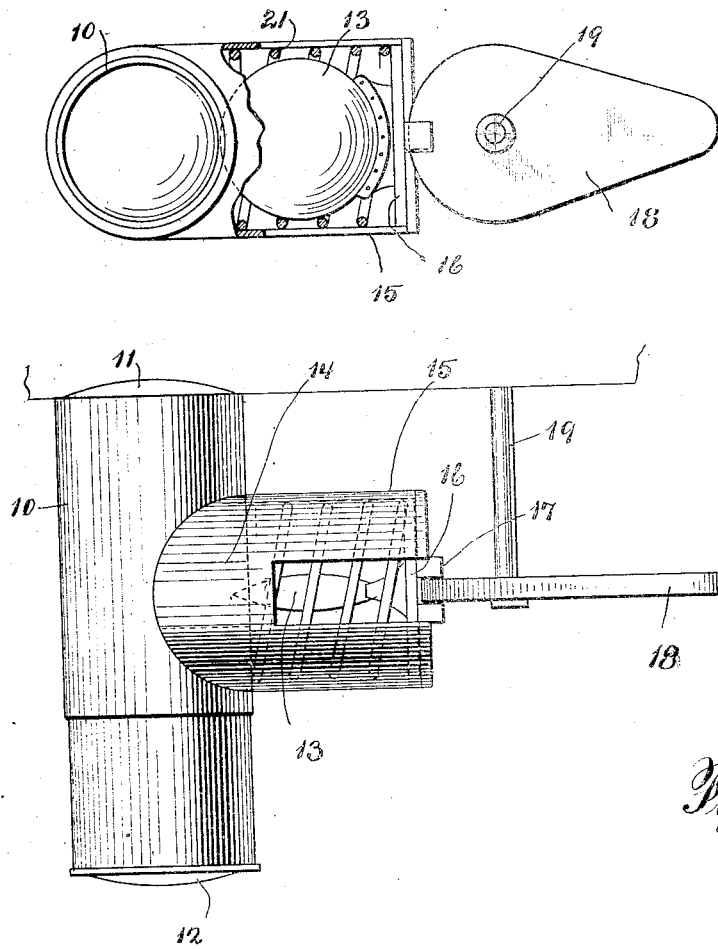

T. DAVIS.
SHUTTER FOR MOVING PICTURE MACHINES.
APPLICATION FILED OCT. 11, 1915.

1,241,828.

Patented Oct. 2, 1917.

Witnesses:

Theron Davis, Inventor,
By his Attorney,
W. B. Hutchinson.

UNITED STATES PATENT OFFICE.

THERON DAVIS, OF NEW YORK, N. Y.

SHUTTER FOR MOVING-PICTURE MACHINES.

1,241,828. Specification of Letters Patent. Patented Oct. 2, 1917.

Application filed October 11, 1915. Serial No. 55,142.

*To all whom it may concern:*

Be it known that I, THERON DAVIS, a citizen of the United States, and a resident of the city, county, and State of New York, have invented a new and useful Improvement in Shutters for Moving-Picture Machines, of which the following is a full, clear, and exact description.

My invention relates to improvements in shutters for moving picture machines. As generally used an opaque shutter is rotated in the path of the projection from the machine, so as to cover the lens and darken the field at the moment that the picture film steps from one position to the next. It is well known that this operation resulting in many instantaneous transitions from darkness to light on the projection field, causes an irritating flicker which is exceedingly trying to the eyes of the spectators, and which also injures the picture effect. I have found that by changing the focal length of the projection at the time the film is given its step, I get the same effect of obscuring the projection field while the film makes the jump, but without in the least darkening such field, so that there is none of the violent transitions from darkness to light, which is confusing to the vision and injurious to the eyes. A simple way of doing this is to interpose into the projected light beam at the time the film moves, a transparent shutter having a lens effect.

My invention consists broadly in obscuring without darkening the picture field. This can best be done by changing the focal length of the projection at the time the film moves. More particularly my invention consists in the interposition across the path of the picture projection of a shutter which is transparent, and which will obscure the picture field, but to have the best effect this shutter should be in the form of a lens which will change the focal length of the projection and so leave the field light, but momentarily pictureless while the step of the film is being made. In practice this period is for so short a time that it is unnoticeable, and the result is a clear, apparently continuous moving picture which does not flicker.

In this specification I illustrate one form of my invention, which is perhaps the simplest way of accomplishing the result, and in which a lens is movable in and out in the projection tube, the lens moving across the tube, while the film makes its step, but I do not limit my invention to any such apparatus, as I claim to be the first to make a transparent shutter for obscuring the field during the movement of the film from one position to the next. I am aware that transparent screens of different colors have been used in color photography and projection, but these are not for the purpose above stated, and do not have the desired effect; and I am also aware that shutters containing lenses have been used, but in cases where it is desirable to have the lens move at the same rate as the film so as to get a more accurate projection; but in my invention the moving lens or shutter is passed directly across the light path so as to serve every purpose of a shutter.

Reference is to be had to the accompanying drawings forming a part of this specification, in which similar reference characters indicate corresponding parts in all the views.

Figure 1 is a front elevation with parts broken away, and in section, of the projection tube showing my improved attachment, and Fig. 2 is a plan view of the same.

The projection tube 10 may be of any usual or preferred kind, and I have shown it provided with lenses 11 and 12 as usual at its inner and outer ends. To get the effect of a shutter without shutting out the light, I preferably employ a member 13 which should be a lens of different focal length from the lenses 11 and 12, and this is movable transversely across the tube through an opening 14 indicated by dotted lines in Fig. 2. The member 13 is preferably contained in a suitable housing 15, and I have illustrated it as being actuated in one direction by a cam, and in the reverse direction by a spring, as the spring gets a very quick action. A convenient means of moving the member 13 is to mount it on a plate 16 contained in the housing 15, and having on the back a way 17 in which rotates a cam 18, this being driven by a shaft 19, which can be turned by any suitable mechanism within the projection machine or exterior thereof if preferred, and obviously the cam should be timed so as to move the shutter or member 13 inward across the light path at the time the film makes its movement from one position to the next.

The cam 18 moves the plate 16 and member 13 against a spring 21, and when the highest point of the cam has passed its inward movement against the plate 16, the spring 21 quickly returns the shutter or member 13 so as to permit of further projection. Any mechanic will see very quickly that this member 13 which has a lens effect, can be arranged in very many ways to traverse the path of light at the time the film makes its movement, and I wish it clearly understood that I do not limit my invention to any particular mechanism which I have shown, although I have shown the method which I consider simplest and best for the purpose.

I claim:—

1. The combination with a moving picture machine having a complete projection lens and a film feed, of a second lens, said second lens being arranged to cross the light aperture of the machine and change the focal length of the projection thereby darkening without obscuring the picture field, and actuating mechanism independent of the film feed for moving said second lens.

2. The combination with a moving picture machine having a complete projection lens and a film feed, of a second lens intermittently crossing the projection beam of light for changing the focal length of the picture without darkening the picture field, and means independent of the film feed for actuating the second lens.

3. The combination with a moving picture machine having a projector complete in itself, of a flicker shutter comprising a lens arranged to cross the aperture of the machine, change the focal length of the projection, and cutting square across the light beam of the machine.

4. The combination with a projection tube of a moving picture machine having a projection lens complete in itself, of a transparent shutter in lens form movable transversely across the tube.

5. The combination with the tube of a moving picture machine having a projection lens complete in itself, of a lens member movable at right angles to the beam of light across the tube while the picture film is being moved, thus obscuring without darkening the picture field.

6. The combination with the tube of a moving picture machine having a projection lens complete in itself, of a lens shutter sliding across said tube while the film is in motion, and means for moving the shutter forward and back across the tube.

THERON DAVIS.

Witnesses:
WARREN B. HUTCHINSON,
ARTHUR G. DANNELL.

Copies of this patent may be obtained for five cents each, by addressing the "Commissioner of Patents. Washington, D. C."